Patented Aug. 18, 1953

2,649,363

UNITED STATES PATENT OFFICE 2,649,363

REGULATION OF THE GROWTH OF UNDESIRED VEGETATION

Arthur W. Swezey, Garden Grove, Calif., assignor to The Dow Chemical Company, Midland, Mich., a corporation of Delaware No Drawing. Application July 13, 1949, Serial No. 104,587

10 Claims. (Cl. 71—2.7)

This invention relates to the regulation of the growth of undesired vegetation and is particularly directed to a method for the control of plant growth by contacting plants and plant parts with a phytotoxic haloacetic acid compound of the group consisting of (1) monohaloacetic acids of the formula:

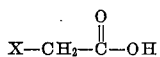

$$X-CH_2-\overset{O}{\overset{\|}{C}}-OH$$

wherein X represents one of the halogens chlorine, bromine and iodine, and (2) their water-soluble salts.

In operating in accordance with the invention, the haloacetic acid compound is contacted with the undesired vegetation at a dosage sufficient to exert a phytotoxic action against the plant growth concerned. Where a non-selective herbicidal action is desired, the dosage of the toxicant is generally between about 20 and about 60 pounds per acre, although amounts as small as 5 pounds per acre have been found effective against certain plant species in an immature state of growth, and much larger dosages may be employed if desired. Where it is desired to control undesired plant growth in mixed stand with a crop plant, the acid compound is applied in an amount sufficient to exert a phytotoxic action against the noxious vegetation without causing substantial permanent injury to the crop plant. In the latter situation a dosage of from 5 to 20 pounds per acre is generally preferred, although substantial selective action has been observed with as little as 2.5 pounds of phytotoxicant per acre, particularly when the undesired plant growth is in the seedling state.

In any event, the exact dosage employed is largely determined by and dependent on the acid compounds selected, the susceptibility of the plant species concerned to the compound selected, the state and condition of growth of the vegetation to be controlled, the physical form in which the phytotoxicant is applied, and the climatic conditions at time of application and shortly thereafter.

One convenient mode of operation comprises dissolving or otherwise dispersing the phytotoxicant in a liquid carrier such as water, oil, an oil in water emulsion, etc., and spraying the resulting composition upon the plant surfaces. In such procedure, the concentration of the toxicant and the spray volume do not appear to be critical, the success or failure of the application depending largely upon the proper selection of dosage per acre and the accomplishing of a relatively uniform dispersion of the chemical over the area under treatment and particularly to the plant surfaces. Standard spray equipment, whether power-driven or manually operated, has been found adequate for the handling of the liquid compositions.

Uniformity of coverage of plant surfaces and resultant maximum effectiveness are favorably influenced by the inclusion in the liquid spray mixtures of suitable wetting and dispersing agents, particularly when plant species having waxy leaf and stem surfaces are concerned, or when the growing portions are enclosed in a sheath of older tissue, such as in the case of the grasses. Any of the conventional spray adjuvants may be employed, provided only that they do not reduce the effectiveness of the mixture as by reacting with the haloacetic acid compound to form nontoxic derivatives or otherwise. Representative materials of established operability include sodium lauryl sulfate, alkylated aryl polyether alcohols, aryl sulfonic acids and their salts, polyglycol ether esters and alcohols, and the like. Where a selective herbicidal action is desired, wetting and dispersing agents are best not included in the spray mixtures. Also, high spray volumes such as 50 to 100 gallons per acre may be employed, to take advantage of the differential wetting obtained by large droplet size in situations where the crop has a foliage surface difficult to wet due to waxy leaf coating, or perpendicular position, or other reason.

An alternate mode of operation comprises incorporating the phytotoxicant in a dust mixture. Finely divided powders which are suitable as carriers include diatomaceous earth, pyrophyllite, clays, talc, wood flours, and the like. Here again the degree of dilution does not appear to be critical, and the results obtained are largely a function of dosage and distribution. Somewhat higher dosages per acre are recommended with dust compositions than with spray mixtures. Also the incorporation of an oily constituent in the dust to act as a sticking agent may be found desirable.

The conditions prevailing at the time of treatment as regards state of plant growth and climatic conditions have a considerable influence upon the effectiveness of the treatment. Thus, plants of many species are more readily controlled when in seedling stage or when putting out new and succulent growth than after they have reached maturity and hardened off to produce semi-woody tissues. Similarly, best results are obtained when the plants are treated under conditions of temperature and soil moisture conducive to the presence of new succulent growth.

Temperatures of 50° F. or higher during and following treatment give good results. Also, it is desirable that the treatment be not immediately followed by rainfall. Where a selective action is desired, it is recommended that the mixed stand of plants be treated at a time when the plant surfaces are not wet from rain or dew.

A preferred embodiment of the invention consists of the treatment of the plant surfaces with spray compositions having the haloacetic acid compound dissolved therein. The chloro- and bromoacetic acid compounds are the preferred toxicants, and sodium monochloroacetate has been found to give excellent results and to be attractive from an economic point of view.

The following examples are illustrative but not to be construed as limiting the invention.

EXAMPLE 1

Bromoacetic acid was dissolved in water along with a combining weight of ammonium hydroxide, and in the presence of sodium lauryl sulfate, and applied with conventional spray apparatus for the control of a substantially pure stand of Bermuda grass (*Cynodon dactylon*) along a roadside. The grass was in a state of moderate growth both vegetative and flowering. The application was made on a partly cloudy to clear day and at an air temperature in the neighborhood of 70° F. The dosage was 40 pounds per acre based on acid equivalent. The wetting agent was present in the amount of 3 pounds per acre treated. The phytotoxicant and wetting agent were employed in water solution, the spray volume being 523 gallons per acre applied at a pressure of 40–50 pounds per square inch.

Six days following application, the treated areas and a check area were inspected to determine the comparative state of growth of the Bermuda grass. It was found that the grass in the check area had continued in a state of moderate growth. In contrast, the area sprayed with the bromoacetic acid composition exhibited an 85–90 per cent top kill.

EXAMPLE 2

In a similar fashion roadside stands of light to heavy Bermuda grass sod were treated with chloroacetic acid and with sodium chloroacetate. These applications were made in triplicated plots with simple aqueous solutions and without the inclusion of any wetting agent. The spray equipment employed was conventional and operated at 150 pounds per square inch. The weather at time of treatment was cloudy followed by warm sun. The temperature was 70–80° F.

The dosages of phytotoxicant were 50 and 100 pounds per acre for the chloroacetic acid and 100 pounds acid equivalent per acre for the sodium chloroacetate. The spray volume was 300 gallons per acre. 8 days following application the treated areas and immediately adjacent check plots were inspected to determine the effect upon the Bermuda grass.

The following table sets forth the results observed:

Table I

| Phytotoxicant | Pounds/Acre (Acid Equivalent) | Percent Top Kill |
| --- | --- | --- |
| Chloroacetic acid | 50 | 70 |
| Do | 100 | 90 |
| Sodium chloroacetate | 100 | 87 |
| Checks | | 10 |

EXAMPLE 3

A series of greenhouse determinations were carried out in which flats containing 34-day old plants of wild mustard, burclover, and prostrate pigweed were treated with aqueous solutions of chloroacetic acid and a variety of salts of chloroacetic acid. The phytotoxic materials were applied at a calculated dosage of 20 pounds acid equivalent per acre, in aqueous solution and in combination with an alkylated aryl polyether alcohol (marketed as Triton X-100) in the amount of 3 pounds per acre. In each instance the aqueous composition was applied to the foliage of the test plant as a spray with a hand sprayer operating at 10 pounds per square inch pressure. The spray was applied at a volume of 100 gallons per acre. 5 days after treatment, the flats were inspected to determine the comparative effectiveness of the test compounds. The following data were obtained:

Table II

| Salt | Percentage Kill | | |
| --- | --- | --- | --- |
| | Wild Mustard | Burclover | Prostrate Pigweed |
| (Straight acid) | 100 | 100 | 100 |
| Magnesium | 100 | 100 | 100 |
| Triethanolamine | 100 | 100 | 100 |
| Copper | 100 | 100 | 100 |
| Potassium | 100 | 100 | 100 |
| Calcium | 100 | 100 | 100 |
| Cadmium | 87.5 | 100 | 100 |
| Isopropylamine | 100 | 100 | 100 |
| Sodium | 100 | 100 | 100 |
| Ammonium | 100 | 100 | 100 |
| Zinc | 87.5 | 100 | 100 |

EXAMPLE 4

Field determinations were carried out in which the ammonium salt of bromoacetic acid was applied to an open pasture to determine the effect of such materials upon a mixed stand of sedge, filaree, and annual grasses. The compound was applied at a dosage of 25.6 pounds per acre in simple water solution and at a spray volume of 118 gallons per acre with a knapsack sprayer operating at a pressure of 50–75 pounds per square inch. The application was made under conditions of dense fog and air temperature of 48°–58° F. The following table sets forth the results observed 5 days following treatment:

Table III

| Phytotoxicant | Percent Top Kill | |
| --- | --- | --- |
| | Broad Leaf | Narrow Leaf |
| Ammonium bromoacetate | 90 | 80 |
| Check | 0 | 0 |

EXAMPLE 5

Sodium chloroacetate was applied to a field stand of bull mallow (*Malva borealis*), the plants being 4 to 14 inches in diameter and 6 to 12 inches in height, growing on moist medium sandy loam. The sodium chloroacetate was employed at 20 pounds acid equivalent per acre as a simple aqueous solution (in the absence of wetting agents) employing varying amounts of water to determine the effect if any of spray volume. A single nozzle weed gun operating at a pressure of 120 pounds per square inch was employed, and application was made at air temperatures of 68°–75° F. and under cloudy conditions. All applications and plots were duplicated.

The spray volumes employed were 20, 40, 80, 160 and 320 gallons per acre. 5 days following application, the sprayed areas were inspected. No significant differences were observed. A uniform result of 70 per cent over all plant injury and 90 per cent leaf burn appeared to have been accomplished regardless of spray volume. 14 days following application, all sprayed bull mallow plants were dead. In check areas all bull mallow plants were growing vigorously.

EXAMPLE 6

Bromoacetic acid and iodoacetic acid were employed at 20 pounds per acre for the control of a stand of burclover plants 3 to 4 inches high. The procedure followed was essentially the tank-mix technique described in Example 1, but employing sodium hydroxide instead of ammonium hydroxide and Triton X-100 in place of sodium lauryl sulfate. The plants were growing on moist medium sandy loam, and were treated on a warm, clear day with a spray volume of 100 gallons per acre employing a hand sprayer operating at a pressure of 40-50 pounds per square inch.

17 days after treatment, the sodium bromoacetate had accomplished a kill of 95 per cent of the plants. Over the same period the composition containing the sodium iodoacetate had killed 92.5 per cent of the test plants.

In an exactly similar determination carried out concurrently with the above, the spray containing the sodium iodoacetate gave a kill of 80 per cent when applied to red-stem filaree in 3 to 4-inch rosette stage.

EXAMPLE 7

40 pounds of monochloroacetic acid and 20 pounds of light lubricating oil is mixed with 100 pounds of fine wood flour and the resulting product scattered broadside over a mixed stand of seedling broadleaf weeds and of grasses. The application is accomplished in such fashion as to accomplish a reasonably uniform distribution of the mixture over the area and to provide for a dosage of 35-40 pounds of monochloroacetic acid per acre. This treatment accomplishes a material reduction in vegetative growth over the area within a period of 10 to 14 days.

EXAMPLE 8

Irrigation ditch banks covered with a rank growth of wild oats, Bermuda grass, malva, fiddleneck, etc., are sprayed with a 3 per cent aqueous oil emulsion containing 70 pounds of monochloroacetic acid per 100 gallons. The composition is applied at the rate of 300 gallons per acre to accomplish a substantially complete top kill of most of the plant species present. Removal of the dead and dried vegetation is conveniently accomplished by burning.

EXAMPLE 9

Chloroacetic acid and sodium chloroacetate were employed in simple aqueous solution without wetting agent or supplementary oil for the selective control of chickweed and shepherds-purse in alfalfa. The crop plant was an established stand on Sacramento clay, and was in largely dormant condition with a scattering of green at time of treatment. The chickweed plants were 1 to 2 inches in height and the shepherds-purse was in 1 to 3 leaf stage. The dosage of phytotoxicant varied, with the spray volume constant at 150 gallons per acre. Application was made during overcast weather with air temperature at 35°-50° F., using a power spray equipped with 6-foot boom and 7 nozzles operating at a pressure of 40 pounds per square inch.

A preliminary observation 16 days after treatment showed the chickweed and shepherds-purse seedlings to be discolored and stunted. Final observations and counts were made 62 days following treatment, at which time the affected weeds were browned and dead and largely disintegrated. At this time, the alfalfa exhibited 1 to 3 inches of new growth with no apparent injury attributable to the selective weeding operation. The following table sets forth the results observed at the time of the final inspection:

| Phytotoxicant | Dosage in Pounds per Acre (Acid Equivalent) | Percent Control of— | |
|---|---|---|---|
| | | Chickweed | Shepherds-purse |
| Chloroacetic acid | 2.5 | 30 | 50 |
| | 5.0 | 65 | 75 |
| | 10.0 | 90 | 100 |
| | 20.0 | 95 | 95 |
| Sodium chloroacetate | 2.5 | 40 | 50 |
| | 5. | 60 | 62 |
| | 10. | 90 | 80 |
| | 20. | 90 | 90 |
| Check | | 0 | 0 |

In analogous determinations, it was found that the alfalfa suffered some reduction in amount of crop growth when dosages as high as 30-40 pounds of phytotoxicant per acre were employed. Also it appeared that the free chloroacetic acid was somewhat more inclined to cause injury than were its alkali metal salts.

I claim:

1. A method for the control of undesired plant growth which comprises contacting the leaf surfaces of the plants with a haloacetic acid compound of the group consisting of (1) monohaloacetic acids of the formula:

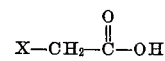

wherein X represents one of the halogens chlorine, bromine and iodine, and (2) their water-soluble salts, such compound being employed at a dosage exerting a phytotoxic action against the plant growth concerned.

2. A method for controlling undesired plant growth in mixed stand with a crop plant which includes the step of applying to the leaf surfaces of the mixed stand a haloacetic acid compound of the group consisting of (1) monohaloacetic acids of the formula:

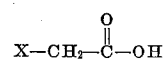

wherein X represents one of the halogens chlorine, bromine and iodine, and (2) their water-soluble salts, the compound being applied in an amount sufficient to exert a phytotoxic action against the noxious vegetation without causing substantial permanent injury to the crop plants.

3. A method for the control of undesired plant growth which comprises contacting the leaf surfaces of the plants with an aqueous solution of a haloacetic acid compound of the group consisting of (1) monohaloacetic acids of the formula:

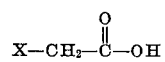

wherein X represents one of the halogens chlorine, bromine and iodine, and (2) their water-soluble salts, such compound being employed at a dosage exerting a phytotoxic action against the plant growth concerned.

4. A method for the control of undesired plant growth which comprises contacting the leaf surfaces of the plants with an oil in water dispersion including as an active phytotoxic constituent a haloacetic acid compound of the group consisting of (1) monohaloacetic acids of the formula:

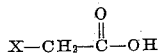

wherein X represents one of the halogens chlorine, bromine and iodine, and (2) their water-soluble salts, such compound being employed at a dosage exerting a phytotoxic action against the plant growth concerned.

5. A method for the control of undesired plant growth which comprises contacting the leaf surfaces of the plants with a haloacetic acid compound of the group consisting of (1) monohaloacetic acids of the formula:

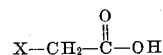

wherein X represents one of the halogens chlorine, bromine and iodine, and (2) their water-soluble salts, such compound being employed at a dosage exerting a phytotoxic action against the plant growth concerned, and at a minimum dosage of 5 pounds per acre.

6. A method for the control of undesired plant growth which comprises contacting the leaf surfaces of the plants with monochloroacetic acid at a dosage exerting a phytotoxic action against the plant growth concerned.

7. A method for the control of undesired plant growth which comprises contacting the leaf surfaces of the plants with monobromoacetic acid at a dosage exerting a phytotoxic action against the plant growth concerned.

8. A method for the control of undesired plant growth which comprises contacting the leaf surfaces of the plants with a sodium monohaloacetate at a dosage exerting a phytotoxic action against the plant growth concerned.

9. A method for the control of undesired plant growth which comprises contacting the leaf surfaces of the plants with sodium monochloroacetate at a dosage exerting a phytotoxic action against the plant growth concerned.

10. A method for controlling undesired plant growth in mixed stand with a crop plant which includes the step of applying to the mixed stand a haloacetic acid compound of the group consisting of (1) monohaloacetic acids of the formula:

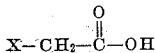

wherein X represents one of the halogens chlorine, bromine and iodine, and (2) their water-soluble salts, the compound being applied in an amount sufficient to exert a phytotoxic action against the noxious vegetation without causing substantial permanent injury to the crop plants, and not greatly in excess of 20 pounds per acre.

ARTHUR W. SWEZEY.

References Cited in the file of this patent

UNITED STATES PATENTS

| Number | Name | Date |
| --- | --- | --- |
| 2,282,732 | Lean et al. | May 12, 1942 |
| 2,393,086 | Bousquet | Jan. 15, 1946 |

OTHER REFERENCES

Botanical Gazette (1946), pages 475 to 483 and 491.

Science, February 20, 1948, pages 196 and 197.